United States Patent
van Weperen et al.

(10) Patent No.: US 6,699,548 B2
(45) Date of Patent: Mar. 2, 2004

(54) THIN-WALLED CYLINDER MADE FROM FIBRE-REINFORCED PLASTICS MATERIAL

(75) Inventors: Karst Jan van Weperen, Uden (NL); Norbertus Franciscus Jacobus Elemans, Westerbeek (NL); Thomas Maria Jonkers, Boxmeer (NL)

(73) Assignee: Stork Screens B.V., Boxmeer (NL)

( * ) Notice: Subject to any disclaimer, the term of this patent is extended or adjusted under 35 U.S.C. 154(b) by 0 days.

(21) Appl. No.: 09/829,844

(22) Filed: Apr. 10, 2001

(65) Prior Publication Data

US 2001/0046575 A1 Nov. 29, 2001

Related U.S. Application Data

(63) Continuation of application No. PCT/NL00/00747, filed on Oct. 17, 2000.

(30) Foreign Application Priority Data

Oct. 18, 1999 (NL) .............................................. 1013328
Dec. 6, 1999 (NL) .............................................. 1013763

(51) Int. Cl.[7] .............................................. B32B 1/08
(52) U.S. Cl. ..................... 428/36.3; 428/36.91; 428/37; 428/222; 428/298.1; 428/299.1; 428/299.4; 428/299.7; 428/300.7; 428/301.4; 428/332; 428/336; 428/339
(58) Field of Search .............................. 428/36.3, 36.91, 428/37, 222, 298.1, 299.1, 299.4, 299.7, 300.7, 301.4, 332, 336, 339

(56) References Cited

U.S. PATENT DOCUMENTS

| | | | |
|---|---|---|---|
| 3,684,605 A | 8/1972 | Zwart | 156/175 |
| 3,981,237 A | 9/1976 | Rhodes | 101/128.2 |
| 4,165,765 A | 8/1979 | Gilbu et al. | 138/174 |
| 4,214,932 A | 7/1980 | Van Auken | 156/187 |
| 5,087,946 A | 2/1992 | Dalal et al. | 355/285 |
| 5,753,324 A * | 5/1998 | Aoyagi et al. | 428/34.6 |

FOREIGN PATENT DOCUMENTS

JP  11278817  10/1999

* cited by examiner

*Primary Examiner*—Sandra M. Nolan
(74) *Attorney, Agent, or Firm*—Hoffmann & Baron, LLP

(57) ABSTRACT

A thin-walled hollow cylinder is made from fiber-reinforced plastics material, the cylinder wall of which is composed of at least one layer having fibers with at least one oriented direction of the fibers, and the total wall thickness $d^{tot}$ lying in the range from 10 to 1000 μm, and the ratio $d^{tot}/D$ being $\leq 0.0025$. The oriented direction(s) of the fibers are selected depending on the intended final application. Examples include, inter alia, multi-layer laminates made from carbon/epoxy, used for the production of a cylinder of this nature, having at least one layer with an oriented direction of the fibers which is parallel or perpendicular to the longitudinal axis of the cylinder.

18 Claims, 2 Drawing Sheets

THIN-WALLED CYLINDER MADE FROM FIBRE-REINFORCED PLASTICS MATERIAL

CROSS-REFERENCE TO RELATED APPLICATIONS

This is a continuation application of PCT/NL00/00747 filed Oct. 17, 2000.

FIELD OF THE INVENTION

The present invention relates to a thin-walled hollow, cylinder made from fibre-reinforced plastics material.

BACKGROUND OF THE INVENTION

A hollow cylinder with a relatively great wall thickness, used as a drive shaft, is known, for example, from DE-A-29 11 167. This known cylinder is of layered structure and comprises at least four layers which contain oriented glass or carbon fibres at defined angles with respect to the longitudinal axis of the shaft. According to this publication, the innermost layer with oriented glass fibres at an angle of ±30° to ±50° serves as a primary support for absorbing shear loads. A first intermediate layer with oriented glass fibres at an angle of 0° to ±15° has the function of increasing the wall thickness in order to counteract torsion during use. A further intermediate layer, which contains carbon fibres with an orientation of 0° to 15°, serves to stiffen the shaft so that the usual sound/noise from a shaft in operation can be suppressed. Finally, the shaft is provided with an outermost, impact-resistant protective layer with glass fibres oriented at an angle of ±60° to 90°, which likewise contributes to resist torsion. The total wall thickness according to the examples is approximately 3.0 mm.

Furthermore, DE-A-25 20 623 has disclosed a tube made from fibre-reinforced plastics material, for example for use in the aeronautical and aerospace sectors, which comprises a plurality of layers containing optionally oriented fibres. EP-A-0 058 783 has disclosed a tubular body which comprises a plurality of plastics layers and with an outermost finishing layer, for example a mast, in which it is preferable for a combination of different fibres to be used.

A thin-walled hollow cylinder is described, for example, in NL-A-8802144, which is used to produce a so-called "galvano" printing forme, perforations in the form of a grid of dots being formed in the cylinder wall by means of a laser. This known cylinder is made from plastics material to which solid particles and/or fibres may be added in order to increase the mechanical stability and strength. Galvano printing formes made from plastics material of this nature have never achieved commercial success.

In addition to the abovementioned use for the production of an galvano printing forme, thin-walled hollow cylinders, often made from metal such as Ni, are also used for other printing applications, for example for relief printing and gravure printing, in which a relief comprising recesses is made into the outer surface of the cylinder, for example with the aid of a laser, or for use as a thin metal support for printing plates for flexographic printing which can be fitted on and removed from an air roller. Other applications for thin-walled hollow cylinders of this nature include, inter alia, the use as a transfer medium for transferring coatings and inks, an electrically conductive cylinder as an electroforming mould, as a coating material, for example as a surface with specific frictional/sliding properties, on an optionally driven roller.

In a number of these applications, it is important that it be possible to process the material of the cylinder with the aid of a laser, which means that the wall thickness must not exceed a defined upper limit. Furthermore, in some printing applications, in which the cylinder is not supported over the entire circumferential surface, but rather only at the ends of the cylinder, for example in end rings, but also in other applications, a thin cylinder of this nature has to be rigid (in the longitudinal direction), certainly if the lengths are relatively great, so that the cylinder is easy to handle, is not damageable and the bending of this cylinder is within acceptable limits.

Furthermore, it is difficult to float nickel cylinders of small diameter on rollers in which the cylinder diameter is increased with the aid of air, such as for example in flexographic printing. Nickel cylinders with a small diameter of this nature are also relatively difficult to produce. In addition, thin nickel cylinders are susceptible to creasing. However, cylinders with a greater wall thickness and therefore a reduced susceptibility to creasing are expensive and more difficult to float.

Thin-walled metal cylinders are often transported and stored with the cylinders pushed together in the shape of a kidney. However, this is only possible from a certain diameter.

Consequently, there is ongoing demand for cylinders with properties which are improved for the intended application, transport and (temporary) storage.

As has already been suggested, in accordance with NL-A-8802144, plastics can generally be made more mechanically stable by the addition of fillers and/or fibres. However, this Dutch patent application does not provide any insight into how the intended increase in mechanical stability can be achieved.

It is noted that U.S. Pat. No. 3,981,237 has disclosed a rotary printing screen made from plastics material, such as polyester. The plastics material may be filled with a reinforcing material such as glass fibres. Such a rotary printing screen is manufactured from a tubular blank made by conventional extrusion methods, which is stretched biaxially afterwards. These filler materials are (short) chopped fibres, which are distributed randomly in the plastics material, even after biaxially stretching. Accordingly the volume concentration of the fibers is 40% at maximum. However, the strength and rigidity of a screen thus manufactured leaves much to be desired. The tubular blank may be perforated by laser radiation to provide the screen openings.

Furthermore it is noted that JP-A-11 278817 has disclosed a cylinder structure made from a carbon fibre-reinforced material. This cylinder structure has a relatively thick wall in view of its application as an insulating cylinder in an apparatus for the production of silicon single crystals using the Czochralski process.

The other publications mentioned above disclose relatively thick-walled hollow cylinders which are not suitable for the abovementioned applications.

In the prior art, it is generally thought to be impossible to produce hollow cylinders from fibre-reinforced plastics material with a relatively great diameter and a small wall thickness (at most approximately 1 mm) which nevertheless have the required mechanical and chemical properties for the abovementioned applications.

Furthermore, it is known that under load plastics materials are deformed more easily than metal, such as nickel, on account of creep.

Accordingly there is a need to provide a thin-walled hollow cylinder made from fibre-reinforced plastics material, in which the wall thickness of the cylinder is such that it can be processed as an intermediate product with the aid of high-energy radiation, while the rigidity is certainly sufficient for numerous other applications, the cylinder being used with optional support and/or with optional rotation.

Also the need exists to provide a thin-walled hollow cylinder of this type made from fibre-reinforced plastics material of this nature, the mechanical properties of which are improved compared to the printing forme made from (fibre-reinforced) plastics material described in the above-mentioned Dutch patent application 8802144.

SUMMARY OF THE INVENTION

The invention provides a thin-walled hollow cylinder made from fibre-reinforced plastics material, comprising at least one layer having fibres with at least one oriented direction of the fibres, the total wall thickness $d^{tot}$ lying in the range from 0.010 to 1 mm (10 to 1000 $\mu$m), and the ratio $d^{tot}/D$ being $\leq 0.0025$, where D is the diameter (in mm) of the cylinder. According to the invention, it has proven possible to create a very thin sleeve with a maximum wall thickness of 1 mm which has a continuous outer surface which can be made smooth and which can be produced within accurate dimensional tolerances, and for which little material is required. As an aside, it is noted that further machining will in many cases be unnecessary.

Preferably the total wall thickness $d^{tot}$ is within the range of 0.010 to 0.700 mm, more preferably within the range of 0.020–0.300 mm.

For example, at a wall thickness of 80 $\mu$m, the minimum diameter is 32 mm, and at a wall thickness of 1000 $\mu$m the minimum diameter of the cylinder is 400 mm. The cylinder is preferably circular in cross section and has a D/L ratio of <1, where L is the length (in mm) of the cylinder.

A lightweight cylinder according to the invention is eminently suitable for use as a sleeve on a rapidly rotating roll or roller, such as for offset printing (1000 rpm), without this sleeve coming off the roller as a result of the centrifugal force. By suitably selecting plastics material(s) and fibre type(s), which have no yield point or a high yield point, it is possible to produce cylinders which are not susceptible to creasing. Compared to metal, in particular nickel, plastics are generally more corrosion-resistant and better able to withstand chemicals, which is advantageous if a cylinder according to the invention is used in aggressive media, such as when printing. Given the ratio of wall thickness to diameter which is defined above, it is possible for a plurality of cylinders according to the invention which are not being used to be transported and stored with ease in the shape of a kidney. The cylinders can easily be produced seamlessly, so that there are no inhomogeneities caused by a weld seam. Compared to metal cylinders, operations such as cutting and perforating are easy to carry out with the cylinders according to the invention.

A single plastics layer with fibres incorporated therein which are oriented in one direction (also referred to below as unidirectional fibres) has anisotropic elastic properties, i.e. the properties are dependent on the direction in which the load is acting.

In this specification a fibre-reinforced plastics material is meant to be a plastics matrix layer, wherein reinforcing fibres are incorporated. According to the invention these fibres are oriented in one direction.

It is known that the addition of fibres generally imparts an improved rigidity to plastics materials. Fibres may be added in the form of so-called short fibres (also known as "chopped fibres"), as long fibres which are arbitrarily distributed in the plastics material, and as unidirectional fibres. The use of unidirectional fibres in principle provides the highest rigidity which can be achieved. Furthermore, the highest fibre content can be achieved with layers having unidirectional fibres, and consequently it is with these fibres that the highest modulus of elasticity can be attained.

The invention also relates to the use of a cylinder according to the invention as a preform for the production of a printing forme for rotary screen printing, as a sleeve for flexographic and offset printing, which is to be mounted on an air roller, as a printing forme for gravure printing, as a transfer medium for transferring coatings and inks, as an electroforming mould or as a coating material.

BRIEF DESCRIPTION OF THE DRAWINGS

The invention is explained below with reference to the appended drawing, in which.

DESCRIPTION OF THE PREFERRED EMBODIMENTS

Figure 1:
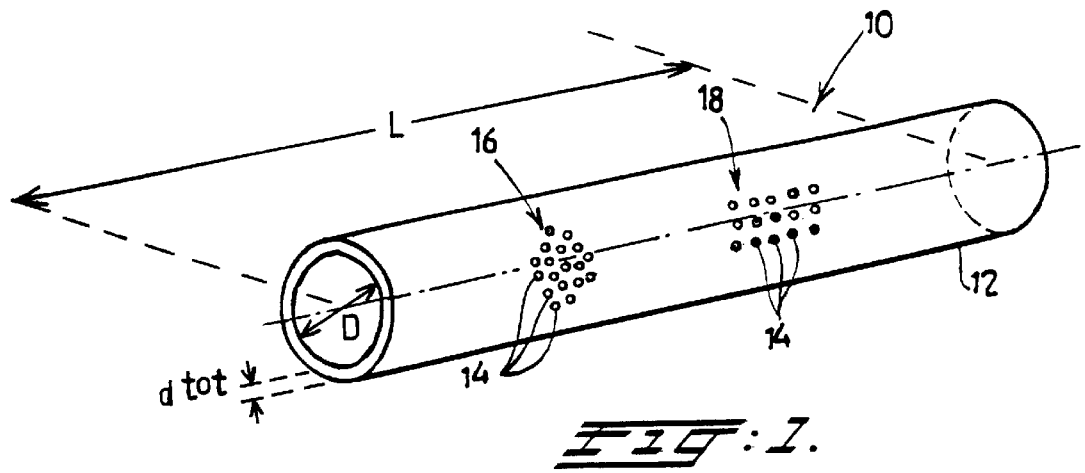
FIG. 1 shows a perspective, diagrammatic view of a printing forme for rotary screen printing which is produced from a cylinder according to the invention.

As has already been stated, a single plastics layer having unidirectional fibres has anisotropic elastic properties. According to the invention, this anisotropy is used to limit the deformation in the direction of load, which occurs in the various applications. This direction of load and therefore the oriented direction of the fibres of the cylinder may differ for each other application.

For certain applications, it is also possible that a plurality of loads may act on the cylinder simultaneously but in different directions, for example if a galvano printing forme for rotary screen printing is produced from the cylinder. According to one embodiment, the cylinder according to the invention therefore comprises a fibre-reinforced layer having fibres with two differently oriented directions of the fibres, such as a woven or braided fabric of fibres, a fibre mat or a fibre cloth.

To reduce the total amount of bending, in particular in the case of long cylinders, it is preferable for an oriented direction of the fibres to run parallel to the longitudinal axis of the cylinder, i.e. in the axial direction.

For cylinders which are mounted on an air roller, for example for flexographic printing, the oriented direction of the fibres is preferably perpendicular to the longitudinal axis of the cylinder.

According to another embodiment of the printing forme according to the invention, the cylinder comprises a first layer having fibres in a first oriented direction of the fibres, and a second layer having fibres in a second oriented direction of the fibres, the first and second directions of the fibres not being identical. As has already been stated, the separate layers having unidirectional fibres may have a high fibre content (compare a fibre content of 63% by volume for a unidirectional carbon fibre in epoxy resin with a fibre content of approximately 35% by volume for a nonwoven in epoxy resin), which is of benefit to the elastic properties. The fibre content of the cylinder according to the invention is preferably greater than 45% by volume. A cylinder of this type according to the invention is composed of at least two layers of fibre-reinforced plastic, of which the fibres in a layer are oriented in one direction and the directions of the fibres do not run parallel to one another.

Preferably, the oriented direction of the fibres of the first layer forms an angle α with the longitudinal axis of the cylinder, and the oriented direction of the fibres of the second layer forms an angle −α with the longitudinal axis of the printing forme. The cylinder advantageously also comprises a further layer having fibres in a third oriented direction of the fibres, the direction of the fibres of which further layer runs parallel or perpendicular to the longitudinal axis of the cylinder. More preferably, this further layer is arranged between the first and second layers.

Examples of the angle α are 0°, 30°, 45° and angles of >60°. A three-layer laminate for use in the cylinder according to the invention therefore comprises 3 layers with differently oriented directions of the fibres of, for example, 0° and ±60° or 0° and ±45° or 0° and 90° (×2) with respect to the longitudinal axis of the cylinder, if the cylinder is a preform for a printing forme for rotary screen printing. A three-layer laminate for use in the cylinder according to the invention as a so-called "sleeve" for flexographic printing therefore comprises 3 layers with differently oriented directions of the fibres of, for example, 90° and ±30° or 90° and ±45° or 0° (×2) and 90° with respect to the longitudinal axis of the cylinder.

According to another embodiment of the cylinder according to the invention, the first layers having a first oriented direction of the fibres and second layers having a second oriented direction of the fibres alternate with one another. One example of an embodiment of this nature is a cylinder which is made from a 4-layer laminate, with the oriented direction of the fibres of the first and third layers and of the second and fourth layers being identical.

According to a particularly preferred embodiment, the cylinder is of symmetrical structure in the thickness direction, and the oriented direction of the fibres of outermost, first layers forms an angle α with the longitudinal axis of the cylinder, and the oriented direction of the fibres of second, intermediate layers forms an angle −α with the longitudinal axis of the cylinder. In this embodiment too, the cylinder advantageously comprises a further layer having fibres in a third oriented direction of the fibres, which direction of the fibres runs parallel or perpendicular to the longitudinal axis of the printing forme. Just as in the cylinder comprising 3 layers which has been discussed above, the further layer is preferably arranged between the second, intermediate layers, i.e. in the centre as seen in the thickness direction of the cylinder wall.

In the multilayer laminates described above, which are used to make the cylinder according to the invention and which comprise a further layer having fibres in an oriented direction of the fibres which is parallel or perpendicular to the longitudinal axis of the cylinder, the thickness of this further layer is advantageously greater than the thickness of the other layers. In this case, the layers with an identically oriented direction of the fibres generally have an identical layer thickness.

Depending on the thickness (diameter) of the fibres and the desired final thickness of the cylinder according to the invention, this cylinder may also comprise a plurality of adjacent layers with the same direction of the fibres.

If a rotary screen-printing forme is produced from the cylinder according to the invention, the total wall thickness is preferably in the range from 80–300 micrometers. A small thickness of this nature also allows printing openings to be made using a laser, in accordance with a design which is to be printed. If the cylinder according to the invention is used as a flexographic printing sleeve, the minimum wall thickness is approximately 0.08 mm. For label printing the total wall thickness is advantageously in the range from 0.02 to 0.15 mm.

The thin-walled cylinder according to the invention are easily machined by a laser, for example to manufacture a printing forme for screen printing. It should be noted that from such a further processed cylinder it is easy to manufacture a flat printing forme by cutting the cylinder in the longitudinal direction and mounting the flat screen thus made onto a suitable planar frame.

The mechanical properties of a printing forme for rotary screen printing which is made from a cylinder according to the invention are also good.

The oriented directions of the fibres, layer thicknesses and material can be varied, although there are preferred directions and materials, depending on the final application as has already been stated above and will be illustrated in more detail below.

If desired, in the cylinder according to the invention, it is possible for the material layers to be combined to form a quasi-isotropic laminate, in order to reduce the anisotropy of a single layer having unidirectional fibres.

As has already been stated above, it is possible for the fibre materials and the plastics of the binder matrix to be selected as a function of the desired properties. Examples of suitable fibre materials include carbon fibres, inorganic fibres such as glass fibres and boron fibres, metal fibres and organic plastic fibres, such as stretched fibres, for example aramid fibres and fibres of high-strength stretched polyethylene, as well as combinations thereof. The carbon fibres and inorganic fibres are particularly preferred, and of these carbon fibres are most preferred. The binder material used is not critical, since it makes little contribution to the mechanical properties compared to the fibres, and may be selected from the known thermoplastics, such as polyesters and thermosetting plastics, such as epoxy resins. Of customary combinations, carbon/epoxy is preferred, on account of the excellent relationship between cost price and rigidity. The rigidity of this combination is virtually twice as great as that of kevlar/epoxy and three times as great as that of glass/epoxy. Other combinations with a still higher rigidity include carbon/polyimide, graphite/epoxy and silicon carbide/ceramic. However, these combinations are expensive. The abovementioned single-layer materials are commercially available.

The elastic parameters for a number of fibre/binder matrix single-layer combinations are described, inter alia, in "Engineering Mechanics of Composite Materials", I. M. Daniel et al., Oxford University Press, 1994, and are compiled below in Table 1.

TABLE 1

| | Fibre content (% by volume) | E modulus // fibres (GPa) | E modulus ⊥ fibres (GPa) | Sliding modulus (GPa) | Poisson's ratio |
|---|---|---|---|---|---|
| E-glass/Epoxy | 55 | 39 | 8.6 | 3.8 | 0.28 |
| S-glass/Epoxy | 50 | 43 | 8.9 | 4.5 | 0.27 |
| Kevlar/Epoxy | 60 | 87 | 5.5 | 2.2 | 0.34 |
| Carbon/PEEK | 58 | 131 | 8.7 | 5.0 | 0.28 |
| Carbon/Epoxy | 63 | 142 | 10.3 | 7.2 | 0.27 |
| Carbon/Polyimide | 45 | 216 | 5.0 | 4.5 | 0.25 |
| Graphite/Epoxy | 57 | 294 | 6.4 | 4.9 | 0.23 |
| Silicon Carbide/Ceramic | 39 | 121 | 112 | 44 | 0.20 |

The elastic parameters for quasi-isotropic laminates are given in table 2 below.

TABLE 2

| | E modulus (GPa) | Sliding modulus (GPa) | Poisson's ratio |
|---|---|---|---|
| E-glass/Epoxy | 18.9 | 7.3 | 0.29 |
| S-glass/Epoxy | 20.9 | 8.2 | 0.27 |
| Kevlar/Epoxy | 32.6 | 12.3 | 0.33 |
| Carbon/PEEK | 50.7 | 19.4 | 0.30 |
| Carbon/Epoxy | 56.7 | 22.1 | 0.29 |
| Carbon/Polyimide | 77.4 | 29.6 | 0.31 |
| Graphite/Epoxy | 104 | 39.7 | 0.31 |
| Silicon carbide/Ceramic | 113 | 46.4 | 0.22 |

The materials from which the layers are made may, in addition to the abovementioned binders and unidirectional fibres, also contain other conventional additives, such as lubricants, adhesion-promoting agents, fillers, pigments and the like, if desired.

Furthermore, if desired, the printing forme according to the invention may be provided with one or more additional surface layers which do not contain any fibres and have desired properties, in particular plastics layers, on the inside and/or outside of the cylinder. Examples of desired properties of this nature include, inter alia, reduced friction (polytetrafluoro-ethylene), wear resistance, scratch resistance, hydrophobic nature and strength.

FIG. 1 illustrates a rotary screen-printing forme 10 which is made from a thin hollow cylinder 12 according to the invention. Perforations are made in this cylinder in accordance with a design to be printed using high-energy radiation, such as a $CO_2$ laser. In this case, these perforations form printing openings 14 which define images 16 and 18 which are to be printed. The total thickness $d^{tot}$ of the cylinder wall is, for example, 140 μm for a diameter D of 203.4 mm and a length L of 1850 mm.

Figure 2:
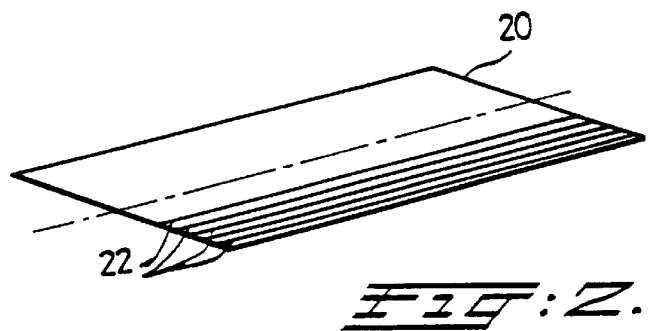
FIG. 2 shows a diagrammatic view of a fibre-reinforced plastics layer having an oriented direction of the fibres.

FIG. 2 shows a planar fibre-reinforced plastics layer 20 having fibres 22 (diagrammatically indicated by relatively thin, continuous lines), of which the oriented direction of the fibres runs parallel to the longitudinal axis of a cylinder which is to be made from this layer. This axial direction of the fibres is advantageous for reducing the total bending of the printing forme 10.

For the sake of simplicity, in the following figures identical components are denoted by identical reference numerals.

Figure 3:
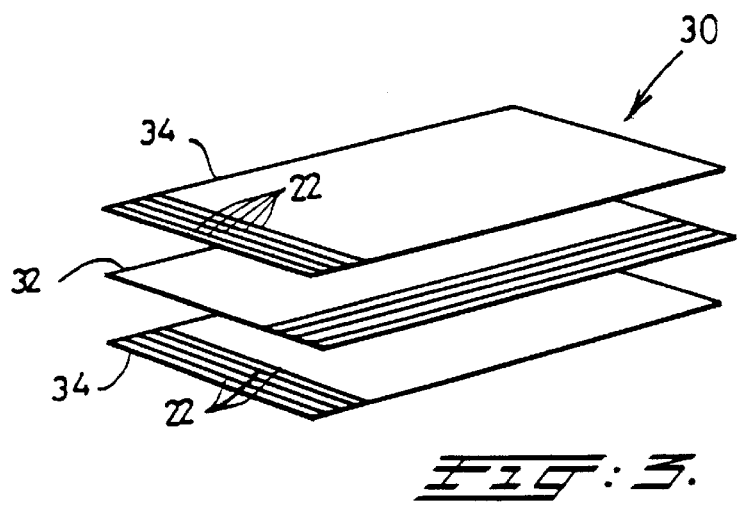
FIG. 3 shows an exploded, diagrammatic view of a symmetrical 3-layer laminate.

FIG. 3 diagrammatically depicts a 3-layer laminate 30, in which the middle layer 32 with a thickness of 84 μm consists of the fibre-reinforced plastics layer shown in FIG. 2, i.e. the fibres 22 run parallel to the longitudinal axis (not shown in FIG. 3). On both sides of the middle layer 32 there is an outermost layer 34 with a thickness of 28 μm, the fibres 22 of which have an orientation which is perpendicular to the longitudinal axis. A laminate with unidirectional fibres of this nature may, for example, be formed by means of customary techniques, such as pultrusion, injection-moulding, lamination and winding, and may be machined, if necessary, by grinding, polishing and the like. However, in most cases further machining of this nature is superfluous. A suitable method for preparing a cylinder according to the invention is disclosed in U.S. Pat. No. 5,071,506. In this method a composite material is applied on a mandrel having an inflatable bladder. The mandrel is inserted into a single press mould. Upon pressurizing the inflatable bladder the composite material is forced against the wall of the mould. Subsequently the composite material is cured.

A laminate in which the central layer has an oriented direction of the fibres which is perpendicular to the longitudinal axis and the oriented directions of the fibres of the outer layers form an angle α, where α is not 90°, and α is preferably 0°, is used as a base structure for the production of a cylinder according to the invention which is supported during use (for example a sleeve for flexographic printing), since in this case less bending can occur but the properties in the tangential direction are of importance.

Figure 4:
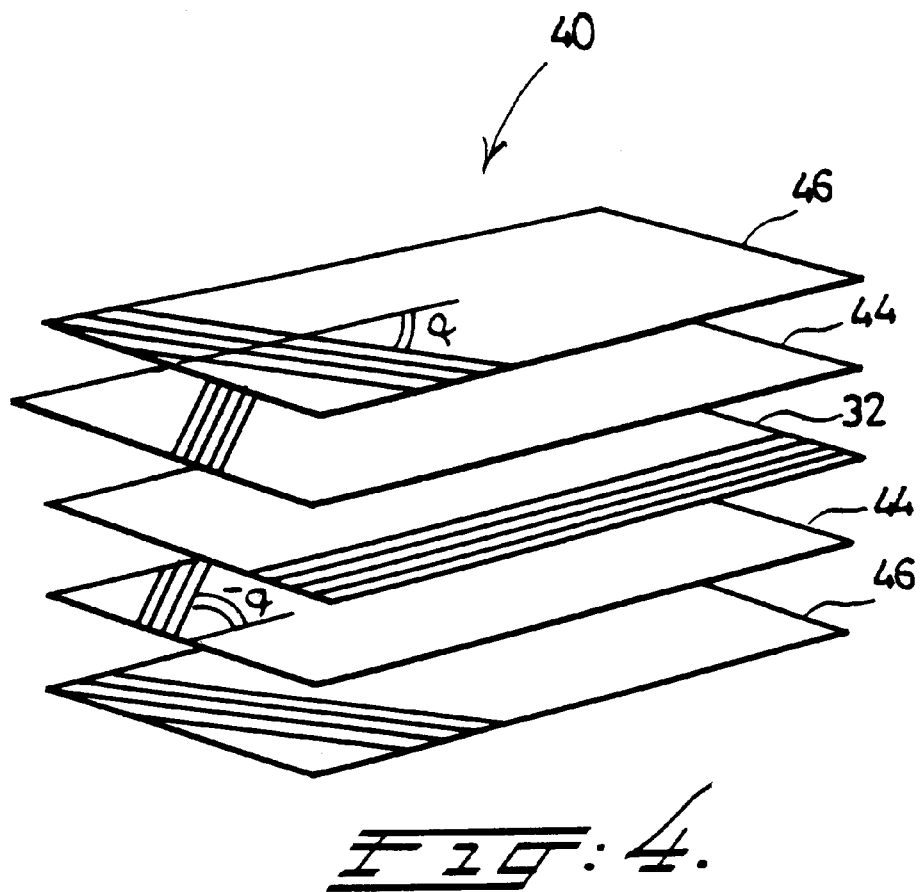
FIG. 4 shows an exploded, diagrammatic view of a 5-layer laminate.

FIG. 4 shows a diagram illustrating the layer structure of an example of a 5-layer laminate 40 according to the invention in planar form. The laminate 40 with a symmetrical structure comprises a middle layer 32 with a thickness of 200 μm, in which fibres 22 are oriented in the longitudinal direction of the cylinder which is to be made from this laminate. On either side of the middle layer 32 there are two intermediate layers 44 with a layer thickness of 20 μm, of which the direction of the fibres forms an angle α −70° with respect to the longitudinal axis. The outermost, first layers 46 likewise with a thickness of 10 μm have fibres 22 with an orientation of +70° with respect to the longitudinal axis. A cylinder with a diameter of 120 mm is produced from this 5-layer laminate.

It should be noted that in practice the selection of a specific direction of the fibres will be partially determined by the reproducibility of the production technique employed and the total costs.

What is claimed is:

1. Thin-walled hollow cylinder consisting of one or more layers made from fibre-reinforced plastics material, wherein at least one of the layers has fibres with at least one oriented direction of the fibres, and wherein the content of the fibres is more than 45% by volume, the total wall thickness $d^{tot}$ lying in the range from 0.010 to 0.700 mm, and the ratio $d^{tot}/D$ being ≦0.0025, where D is the diameter in mm, of the cylinder.

2. Cylinder according to claim 1, wherein the total wall thickness is in the range from 0.020 to 0.300 mm.

3. Cylinder according to claim 1, wherein the cylinder comprises a fibre-reinforced layer having fibres with two oriented directions of the fibres.

4. Cylinder according to claim 1, wherein an oriented fibre direction lies parallel or perpendicular to the longitudinal axis of the cylinder.

5. Cylinder according to claim 1, wherein the cylinder comprises a first layer having fibres in a first oriented direction of the fibres, and a second layer having fibres in a second oriented direction of the fibres, the oriented directions of the fibres not being identical.

6. Cylinder according to claim 5, wherein the oriented direction of the fibres of the first layer forms an angle α with the longitudinal axis of the cylinder, and the oriented direction of the fibres of the second layer forms an angle −α with the longitudinal axis of the cylinder.

7. Cylinder according to claim 5, wherein the cylinder also comprises a further layer having fibres in a third oriented direction of the fibres, the direction of the fibres running parallel or perpendicular to the longitudinal axis of the cylinder.

8. Cylinder according to claim 7, wherein the said further layer is present between the first layer and the second layer.

9. Cylinder according to claim 5, wherein first layers having a first oriented direction of the fibres and second layers having a second oriented direction of the fibres alternate with one another.

10. Cylinder according to claim 1, wherein the cylinder is of symmetrical structure in the thickness direction, and the oriented direction of the fibres of outermost, first layers forms an angle α with the longitudinal axis of the cylinder, and the oriented direction of second, intermediate layers forms an angle −α with the longitudinal axis of the cylinder.

11. Cylinder according to claim 10, wherein the cylinder comprises a further layer having fibres in a third oriented direction of the fibres, which direction of the fibres runs parallel or perpendicular to the longitudinal axis of the cylinder.

12. Cylinder according to claim 11, wherein the further layer is arranged between the second, intermediate layers.

13. Cylinder according to claim 10, wherein the layer thickness of the outermost, first layers is identical.

14. Cylinder according to claim 7, wherein the thickness of the further layer is greater than the thickness of the other layers.

15. Cylinder according to claim 1, wherein the fibre-reinforced plastics material consists of unidirectional carbon fibres in an epoxy matrix.

16. Cylinder according to claim 1, wherein the cylinder is made from a quasi-isotropic laminate.

17. Thin-walled hollow cylinder consisting essentially of one or more layers made from fibre-reinforced plastics material and a surface layer, wherein at least one of the layers has fibres with at least one oriented direction of the fibres, wherein the content of the fibres is more than 45% by volume, the total wall thickness $d^{tot}$ lying in the range from 0.010 to 0.700 mm, and the ratio $d^{tot}/D$ being $\leq 0.0025$, where D is the diameter, in M, of the cylinder, and further wherein the surface layer, which does not contain any fibres, is provided on the inside and/or outside of the cylinder.

18. Cylinder according to claim 1, wherein the cylinder is seamless.

* * * * *

UNITED STATES PATENT AND TRADEMARK OFFICE
CERTIFICATE OF CORRECTION

PATENT NO. : 6,699,548 B2
DATED : March 2, 2004
INVENTOR(S) : van Weperen et al.

It is certified that error appears in the above-identified patent and that said Letters Patent is hereby corrected as shown below:

<u>Column 10,</u>
Line 23, the printed patent incorrectly reads "...where D is the diameter, in M,...". The patent should correctly read, -- where D is the diameter, in mm,...--.

Signed and Sealed this

Twenty-first Day of September, 2004

JON W. DUDAS
*Director of the United States Patent and Trademark Office*